United States Patent
Toki et al.

(10) Patent No.: US 7,919,951 B2
(45) Date of Patent: Apr. 5, 2011

(54) SYSTEM STABILIZATION CONTROL SYSTEM

(75) Inventors: Naohiro Toki, Tokyo (JP); Masatoshi Takeda, Tokyo (JP); Yoshiyuki Kono, Tokyo (JP); Koji Temma, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 717 days.

(21) Appl. No.: 11/802,531

(22) Filed: May 23, 2007

(65) Prior Publication Data

US 2007/0279016 A1 Dec. 6, 2007

(30) Foreign Application Priority Data

May 30, 2006 (JP) .................................. 2006-150055

(51) Int. Cl.
*G05F 5/00* (2006.01)
(52) U.S. Cl. ........................................... 323/210
(58) Field of Classification Search .................. 323/205, 323/209–211
See application file for complete search history.

(56) References Cited

U.S. PATENT DOCUMENTS

| 5,134,356 A * | 7/1992 | El-Sharkawi et al. ........ 323/211 |
| 2005/0194944 A1 * | 9/2005 | Folts et al. .................... 323/209 |

FOREIGN PATENT DOCUMENTS

| JP | 61-156320 | | 7/1986 |
| JP | 62-269213 | A | 11/1987 |
| JP | 03-183325 | | 8/1991 |
| JP | 07-015875 | | 1/1995 |

* cited by examiner

*Primary Examiner* — Adolf Berhane
*Assistant Examiner* — Jue Zhang
(74) *Attorney, Agent, or Firm* — Buchanan Ingersoll & Rooney PC

(57) ABSTRACT

In a system stabilizing control system of controlling reactive power by a reactive power compensating device according to a voltage variation of an electric power system in which a capacitor is connected to a bus through a breaker, when the bus voltage drops, the capacitor is closed through the breaker to suppress a leading compensation reactive power amount caused by the reactive power compensating device, and when the bus voltage rises, the capacitor is disconnected through the breaker to suppress a lagging compensation reactive power amount caused by the reactive power compensating device.

8 Claims, 6 Drawing Sheets

DATA STORAGE TABLE AT TIME OF DROP OF VOLTAGE

| VOLTAGE THRESHOLD (VL1, VL2) | MSC CLOSING/DISCONNECTION | |
|---|---|---|
| | MSC1 | MSC2 |
| VL1<Vss | DISCONNECTION | DISCONNECTION |
| VL2<Vss<VL1 | CLOSING | DISCONNECTION |
| Vss<VL2 | CLOSING | CLOSING |

(b)

DATA STORAGE TABLE AT TIME OF RISE OF VOLTAGE

| VOLTAGE THRESHOLD (VH1, VH2) | MSC CLOSING/DISCONNECTION | |
|---|---|---|
| | MSC1 | MSC2 |
| VH1≤Vss | DISCONNECTION | DISCONNECTION |
| VH2≤Vss<VH1 | CLOSING | DISCONNECTION |
| Vss<VH2 | CLOSING | CLOSING |

SYSTEM STABILIZATION CONTROL SYSTEM

BACKGROUND OF THE INVENTION

1. Field of the Invention

The present invention relates to a system stabilizing control system for stabilizing an electric power system, in which at the time of a fault of the electric power system, a capacitor (hereinafter referred to as "MSC") is closed through a breaker, and at the time of recovery from the fault, a reactive power compensating device (hereinafter referred to as "SVC") is actuated and the MSC is disconnected.

2. Description of the Related Art

In the related art, although a control of compensating reactive power consumed by a load at the time of load variation is performed in an SVC and a capacitor (hereinafter referred to as "SC") connected to an electric power system in parallel to a varying load, the control does not deal with the transition time in a fault recovery stage from a fault of the electric power system (for example, see JP-A-62-269213 (FIG. 1 and its explanation)).

In the case where a fault occurs in the electric power system using a SVC and plural SCs in the related art, the SVC controls a range wider than a unit bank capacity of the SC, and the control is such that at the time of the fault of the electric power system, the SVC instantaneously outputs a large reactive power, and then, the SC in each unit bank is sequentially closed, and at the time of fault recovery, the surplus reactive power is instantaneously absorbed by the SVC, and then, the SC in each unit is disconnected, and accordingly, the effective capacity of SVC becomes larger than the actual capacity.

Accordingly, in the system stabilizing control system of performing the system stabilizing control by the capacitor and the SVC, it is necessary to prevent the SVC capacity from becoming large.

SUMMARY OF THE INVENTION

The invention has been made in view of the above circumstances, and has an object to enable system stabilizing control with a relatively small SVC capacity as compared with the related art.

A system stabilizing control system according to an aspect of the invention is a system stabilizing control system of controlling reactive power by a reactive power compensating device according to a voltage variation of an electric power system in which a capacitor is connected to a bus through a breaker, and when a bus voltage drops, the capacitor is closed through the breaker to suppress a leading compensation reactive power amount caused by the reactive power compensating device, and when the bus voltage rises, the capacitor is disconnected through the breaker to suppress a lagging compensation reactive power amount caused by the reactive power compensating device. According to this invention, in the system stabilizing control system of controlling the reactive power by the reactive power compensating device according to the voltage variation of the electric power system in which the capacitor is connected to the bus through the breaker, the system stabilizing control system can be performed with a relatively small SVC capacity as compared with the related art method.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are views showing embodiment 5 of the invention and are views illustrating a relation between voltage drop of an electric power system and MSC closing/disconnection and examples of a data storage table in tabular form.

DETAILED DESCRIPTION OF THE INVENTION

Embodiment 1

Figure 1:
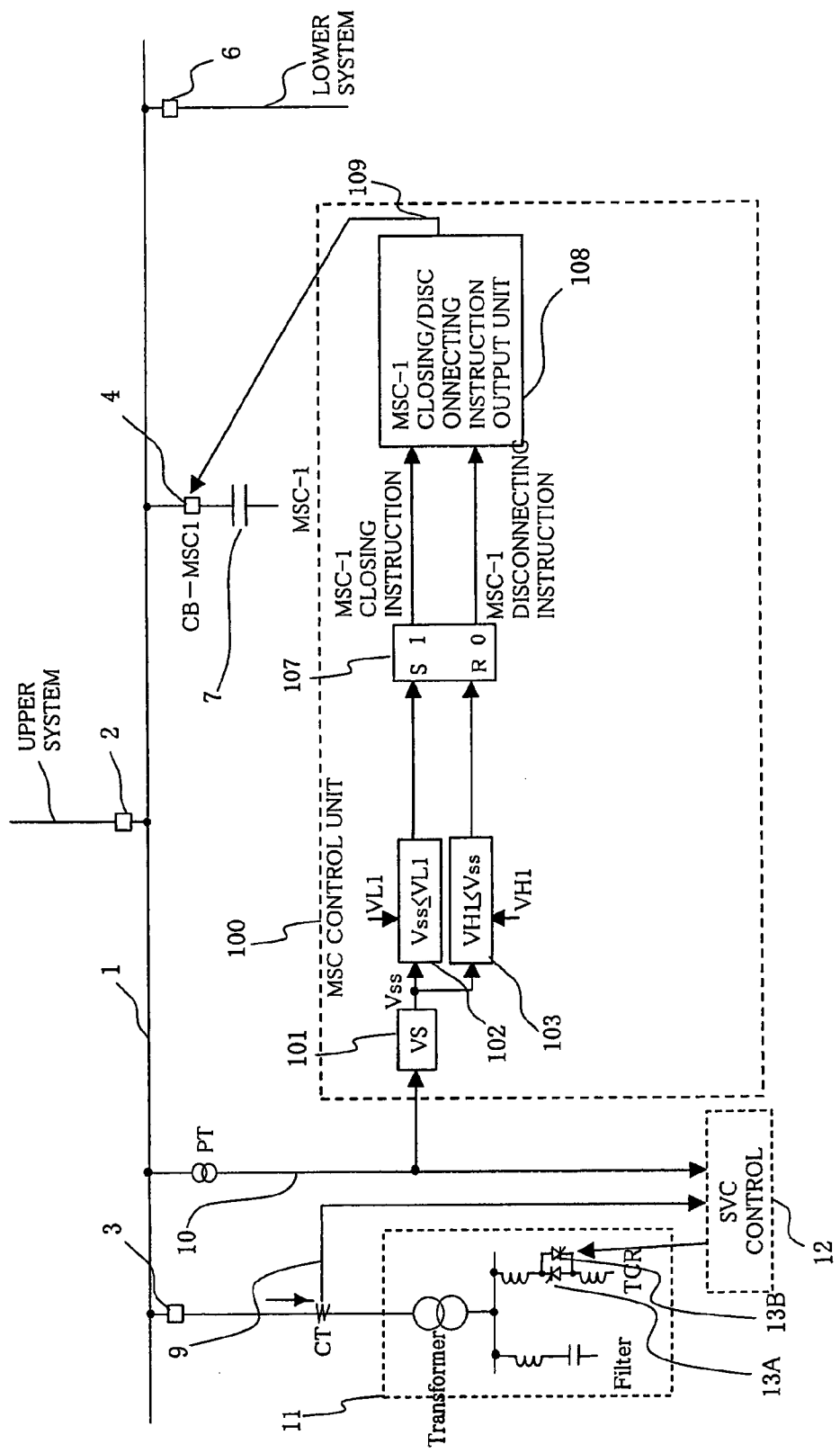
FIG. 1 is a view showing embodiment 1 of the invention, a structural view showing an example of a system stabilizing system, a general cooperative control block view in a control method by an MSC, and a structural view of an electric power system.

Hereinafter, embodiment 1 of the invention will be described with reference to FIG. 1. FIG. 1 shows a structural example of an electric power system in which an SVC and an MSC are installed in the electric power system.

In FIG. 1, a bus 1 is connected to an upper system through a breaker 2, is connected to a lower system through a breaker 6, and is connected to the SVC 11 and the MSC 7 through a breaker 3 and a breaker 4.

A bus voltage measured by a PT connected to the bus 1 and a current measured by a CT and flowing to the SVC 11 are captured by an SVC control unit 12, gate pulses are sent to thyristors 13A and 13B from the SVC control unit 12 so as to suppress a regular voltage variation of the bus 1 at all time, and the SVC 11 is controlled.

Besides, the voltage of the bus 1 measured by the PT is converted by a voltage detector (hereinafter referred to as "VS") 101 into an effective value, comparators 102 and 103 judge its magnitude to obtain signals which are sent to a flip-flop 107, closing/disconnecting instructions of the MSC 7 are sent to a closing/disconnecting instruction output unit 108 by the flip-flop 107, and according to the closing/disconnecting instructions, a closing/disconnecting instruction signal 109 is sent from the closing/disconnecting instruction unit 108 to the breaker 4, and the closing/disconnecting control of the MSC 7 is performed.

In the structure as stated above, in the case where a large voltage variation occurs in the bus 1 due to a fault or the like in the electric power system, an output signal (hereinafter referred to as "VSS") of the VS 101 is compared with a voltage threshold VL1 at a low voltage side by the comparator 102, and the output signal of the VS101 is compared with a voltage threshold VH1 at a rising side by the comparator 103.

As a result of the comparison by the comparators 102 and 103, in the case where the VSS is the VL1 or lower, the closing instruction is sent to the breaker 4 by the MSC-1 closing/disconnecting instruction output unit 108, and the MSC 7 is closed.

As a result of the comparison by the comparators 102 and 103, in the case where the VSS is the VH1 or higher, the MSC-1 closing/disconnecting instruction unit 108 sends the disconnecting instruction to the breaker 4, and the MSC 7 is disconnected.

In this case, when the bus voltage drops, the MSC 7 is closed so that the leading compensation reactive power amount caused by the SVC 11 is suppressed, and when the bus voltage rises, the MSC 7 is disconnected so that the lagging compensation reactive power amount caused by the SVC 11 is suppressed.

As described above, according to the embodiment 1 of the invention, at the time of the voltage variation of the electric power system, the MSC is closed/disconnected according to the magnitude of the voltage variation, and therefore, there is an effect that the SVC capacity may be small.

Embodiment 2

Figure 2:
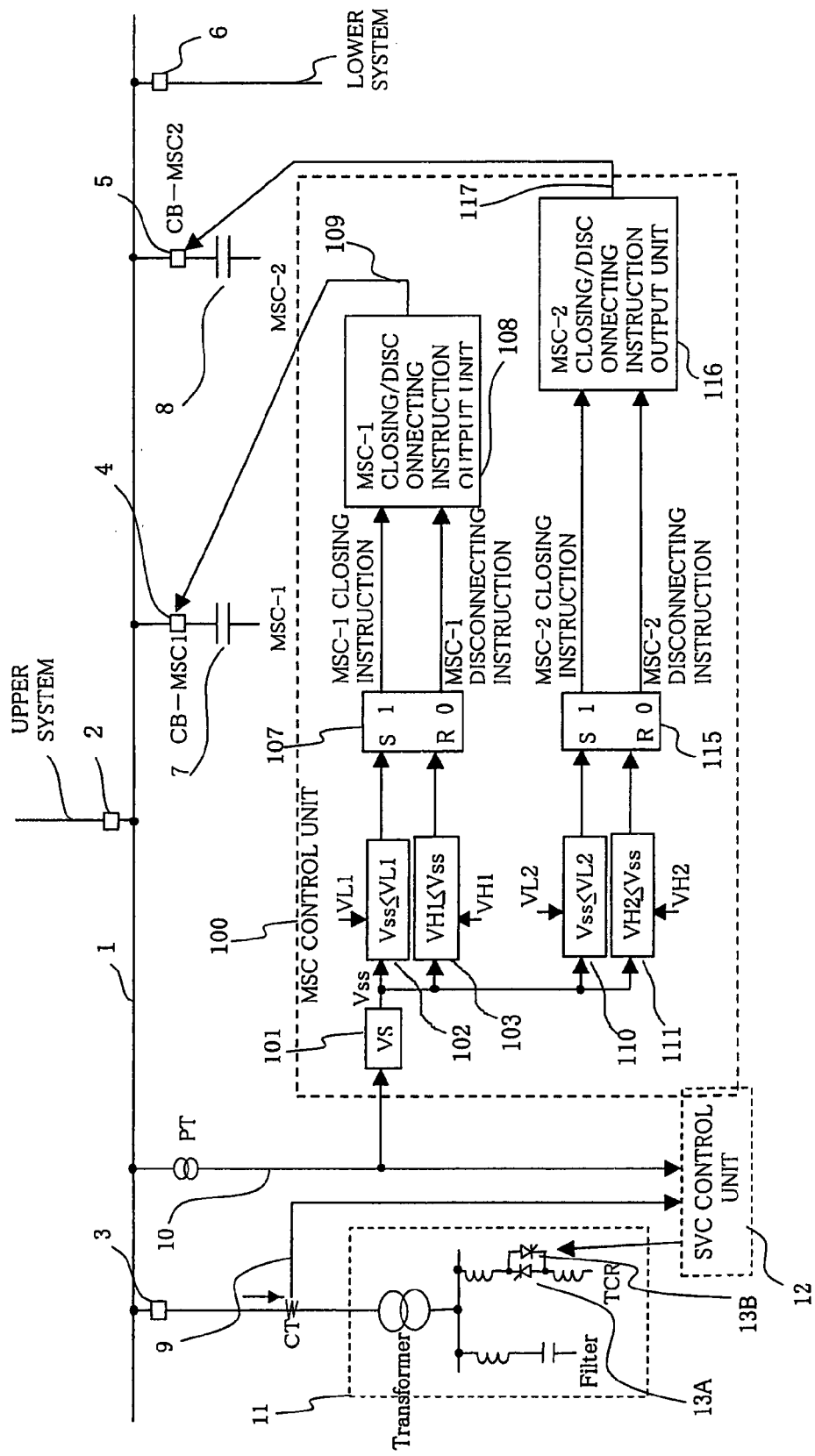
FIG. 2 is a view showing embodiment 2 of the invention, a structural view showing an example of a system stabilizing method, a general cooperative control block view in a control method by plural MSCs, and a structural view of an electric power system.

FIG. 2 is a structural view in which the MSC of the embodiment of FIG. 1 is divided and plural ones are connected. Incidentally, in FIG. 2, the same portions as those of FIG. 1 are denoted by the same symbols and their description will be omitted.

In FIG. 2, an MSC 8 is connected to a bus 1 through a breaker 5. In an MSC control unit 100, a voltage of the bus 1 measured by a PT is converted into an effective value by a VS 101, comparators 110 and 111 different from each other in voltage threshold judge its magnitude to obtain signals which are sent to a flip-flop 115, the flip-flop 115 sends closing/disconnecting instructions of the MSC 8 to a closing/disconnecting instruction output unit 116, and according to the closing/disconnecting instruction, the closing/disconnecting instruction output unit 116 sends a closing/disconnecting instruction signal 117 to the breaker 5, and the closing/disconnecting control of the MSC 8 is performed.

In the structure as stated above, in the case where a large voltage variation occurs in the bus 1 by a fault or the like in the electric power system, and the voltage variation is a drop in voltage, and in the case where a relation of VL2<VSS≦VL1 is established among the VSS, a voltage threshold VL1 at a low voltage side of a comparator 102, and a voltage threshold VL2 at a low voltage side of the comparator 110, the breaker 4 is closed and the MSC 7 is connected to the bus 1. In the case where a relation of VSS≦VL2<VL1 is established, the breakers 4 and 5 are closed, and the MSC 7 and the MSC 8 are connected to the bus 1.

On the other hand, in the case where the voltage variation is a rise in voltage, and in the case where a relation of VH2>VSS≧VH1 is established among the VSS, a voltage threshold VH2 at a rising side of the comparator 111, and a voltage threshold VH1 at a rising side of the comparator 103, the breaker 5 is disconnected, and the MSC 8 connected to the bus 1 is removed from the bus 1. In the case where a relation of VSS≧VH2>VH1 is established, the breakers 4 and 5 are disconnected, and the MSC 7 and the MSC 8 connected to the bus 1 are removed from the bus 1. In this case, when the bus voltage drops, the MSC 7 and the MSC 8 are selectively closed according to the degree of the drop, so that the leading compensation reactive power amount caused by the SVC 11 is suppressed according to the degree of the drop in voltage. When the bus voltage rises, the MSC 7 and the MSC 8 are selectively disconnected according to the degree of the rise, so that the lagging compensation reactive power amount caused by the SVC 11 is suppressed according to the degree of the rise in voltage.

Incidentally, in this embodiment, although the two MSCs are installed, it is needless to say that the number is not limited.

As described above, according to the embodiment 2 of the invention, when the SVC and the MSC cooperate with each other to suppress the voltage variation due to the electric power system fault or the like, the detailed closing/disconnecting control of the MSC according to the degree of the voltage variation is carried out, and accordingly, there is an effect that the SVC capacity is made smaller.

Embodiment 3

Figure 3:
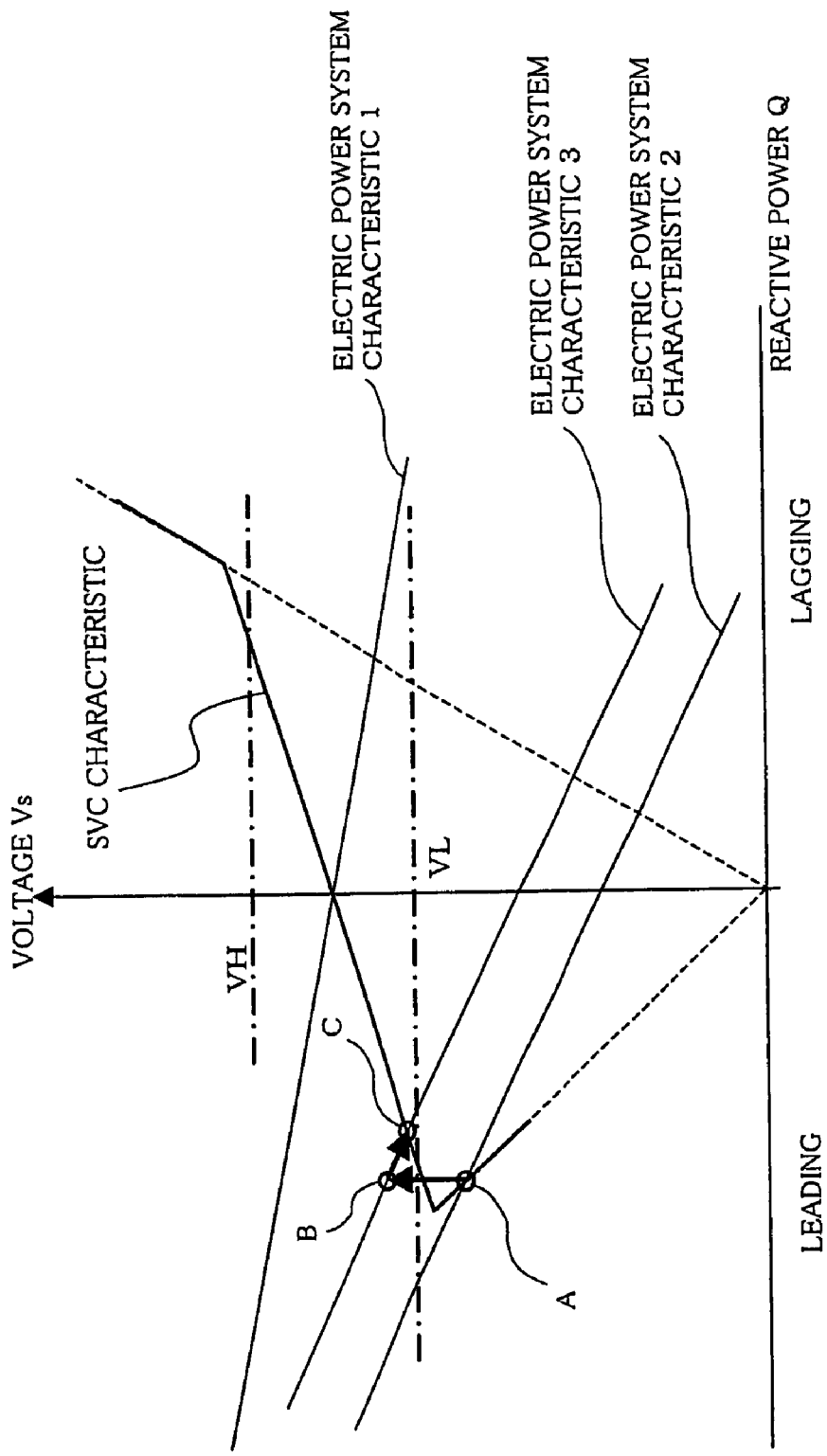
FIG. 3 is a view showing embodiment 3 of the invention, and a general explanatory view in which a reactive power-voltage characteristic of an SVC at the time of voltage drop of an electric power system is used.

FIG. 3 is an explanatory view showing, with respect to the comparator 102 of FIG. 1, a relation between a voltage-reactive power characteristic of an SVC and voltage recovery by MSC closing at the time of drop in bus voltage. A description of FIG. 1 will be omitted.

In FIG. 3, an SVC characteristic is a voltage-reactive power characteristic of the SVC 11, an electric power system characteristic 1 is a voltage-reactive power characteristic of the electric power system at the normal time, an electric power system characteristic 2 is a voltage-reactive power characteristic of the electric power system after an electric power system structure is changed to a structure at the voltage drop side by an electric power system fault or the like, and an electric power system characteristic 3 is a characteristic in which a voltage change value raised by closing of the MSC 7 is added to the electric power system characteristic 2. Besides, VH denotes a voltage threshold at the rise side, and VL denotes a voltage threshold at the drop side.

In the relation as stated above, when the electric power system structure is changed by the fault or the like of the electric power system and the electric power system characteristic 1 is changed to the electric power system characteristic 2, in the case where the SVC 11 is connected to the bus 1, the bus 1 has a voltage at an intersection point A of the SVC characteristic and the electric power system characteristic 2, and the voltage is not higher than the voltage threshold VL at the low voltage side. When the MSC 7 is closed to the bus 1, the intersection point A of the electric power system characteristic 2 rises to B, the electric power system characteristic slides from the electric power system characteristic 2 to the electric power system characteristic 3 at the voltage rising side, an intersection point C of the electric power system characteristic 3 and the SVC characteristic C becomes a voltage of the bus 1 by the control of the SVC 11, and the control is performed to the voltage not lower than the voltage threshold VL.

As stated above, according to the embodiment 3 of the invention, at the time of voltage drop of the electric power system, the voltage-reactive power characteristic of the SVC and the voltage threshold are made to cooperate with each other to close/disconnect the MSC, and therefore, there is an effect that the bus voltage can be controlled to be not smaller than the voltage threshold at the low voltage side by a small SVC capacity.

Embodiment 4

Figure 4:
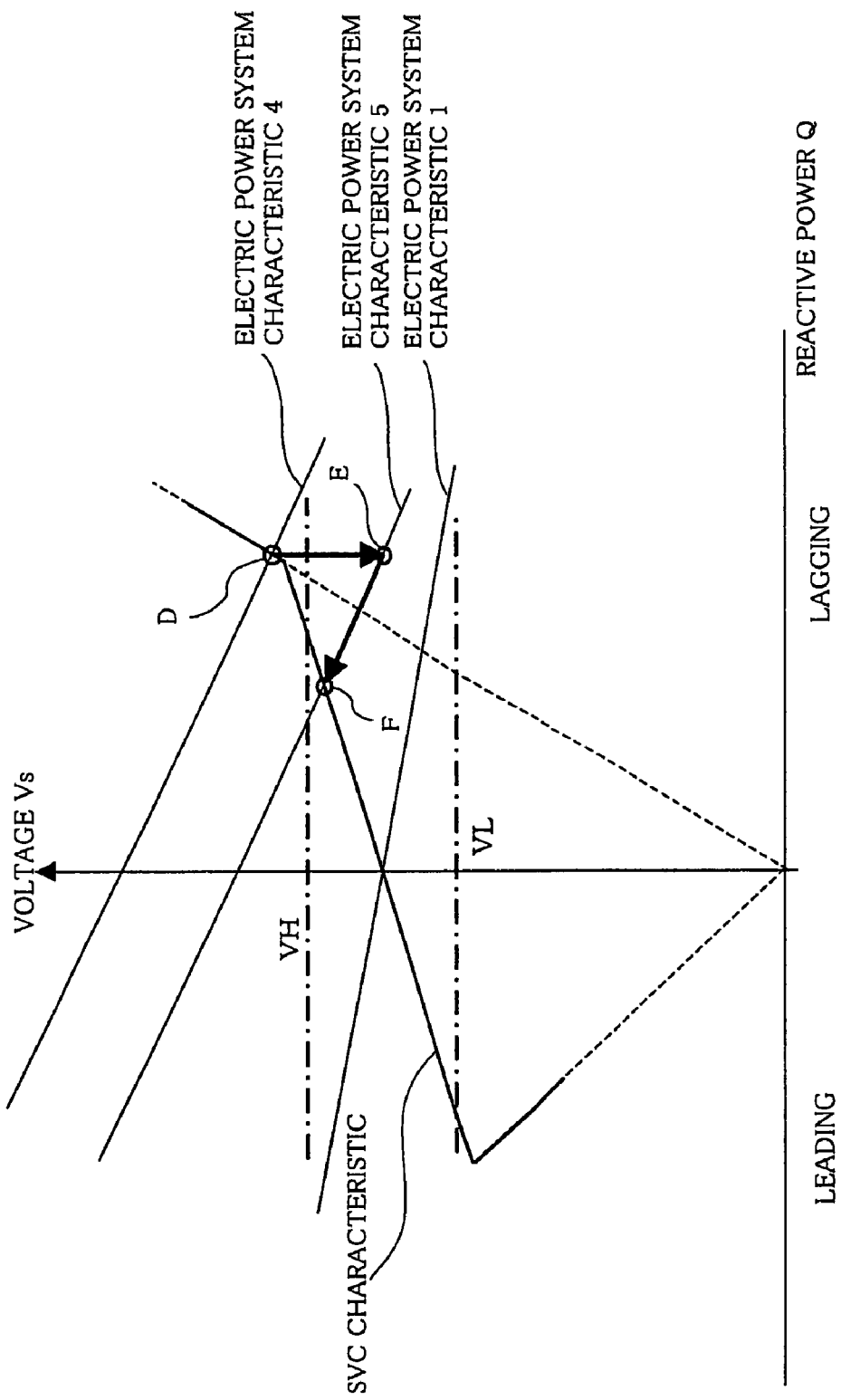
FIG. 4 is a view showing embodiment 4 of the invention, and a general explanatory view in which a reactive power-voltage characteristic of an SVC at the time of voltage rise of an electric power system is used.

FIG. 4 is an explanatory view showing, with respect to the comparator 103 of FIG. 1, a relation between a voltage-reactive power characteristic of an SVC and voltage recovery by disconnection of an MSC at the time of rise in bus voltage. A description of FIG. 1 will be omitted.

In FIG. 4, an SVC characteristic is a voltage-reactive power characteristic of the SVC 11, an electric power system characteristic 1 is a voltage-reactive power characteristic of the electric power system at the normal time, an electric power system characteristic 4 is a voltage-reactive power characteristic of the electric power system after an electric power system structure is changed to a structure at the voltage rise side by an electric power system fault or the like, and an electric power system characteristic 5 is a characteristic in which a voltage change value dropped by disconnection of the MSC 7 is subtracted from the electric power system characteristic 4. Besides, VH denotes a voltage threshold at the rise side, and VL denotes a voltage threshold at the drop side.

In the relation as stated above, when the electric power system structure is changed by the fault or the like of the electric power system and the electric power system characteristic 1 is changed to the electric power system characteristic 4, in the case where the SVC 11 is connected to the bus 1, the bus 1 has a voltage of an intersection point D of the SVC characteristic and the electric power system characteristic 4, and it is not lower than the voltage threshold VH at the rise side.

When the MSC 7 is disconnected from the bus 1, the voltage drops from the intersection point D of the electric power system characteristic 4 to E, the electric power system characteristic slides from the electric power system characteristic 4 to the electric power system characteristic 5 at the voltage drop side, an intersection point F of the electric power system characteristic 5 and the SVC characteristic becomes the voltage of the bus 1 by the control of the SVC 11, the control is performed to the voltage not higher than the voltage threshold value VH.

As stated above, according to the embodiment 4 of the invention, at the time of voltage rise of the electric power system, the voltage-reactive power characteristic of the SVC and the voltage threshold are made to cooperate with each other to close/disconnect the MSC, and therefore, there is an effect that the bus voltage can be controlled to be not higher than the voltage threshold at the rise side by a small SVC capacity.

Embodiment 5

FIGS. 5A and 5B show, by data storage tables, voltage thresholds and MSC closing/disconnection at the time of voltage drop and at the time of voltage rise of the electric power system in the comparators 102, 103, 110 and 111 of FIG. 2. A description of FIG. 2 will be omitted.

In the data storage tables in tabular form shown in FIGS. 5A and 5B, VL1 and VL2 denote voltage thresholds at a low voltage side, and VH1 and VH2 denote voltage thresholds at a rise side. In the case where the voltage Vss of the bus 1 drops to VL2<Vss<VL1, in accordance with the data storage table, a closing instruction is sent from the closing/disconnecting instruction unit 108 to the breaker 4, and the breaker 4 is closed. In the case where the voltage Vss of the bus 1 drops to Vss<VL2, in accordance with the data storage table, a closing instruction is sent from the closing/disconnecting instruction output unit 108 to the breaker 4 and the breaker 5, and the breaker 4 and the breaker 5 are closed.

On the other hand, in the case where the voltage of the bus 1 is recovered to the rise side, when Vss<VH2 is established, the breaker 4 and the breaker 5 are in the closing state, and in accordance with the data storage table, when VH2≦Vss<VH1 is established, an instruction to disconnect the breaker 5 is sent from the closing/disconnecting instruction output unit 108 to the breaker 5, and when VH1<Vss is established, an instruction to disconnect the breaker 4 is sent, and the respective breakers are disconnected.

As stated above, according to the embodiment 5 of the invention, since the voltage thresholds at the time of voltage drop and at the time of voltage rise of the electric power system and the MSC closing/disconnection are stored in the data storage table form, there is an effect that the closing/disconnection of plural MSCs can be controlled at high speed.

Embodiment 6

Figure 6:
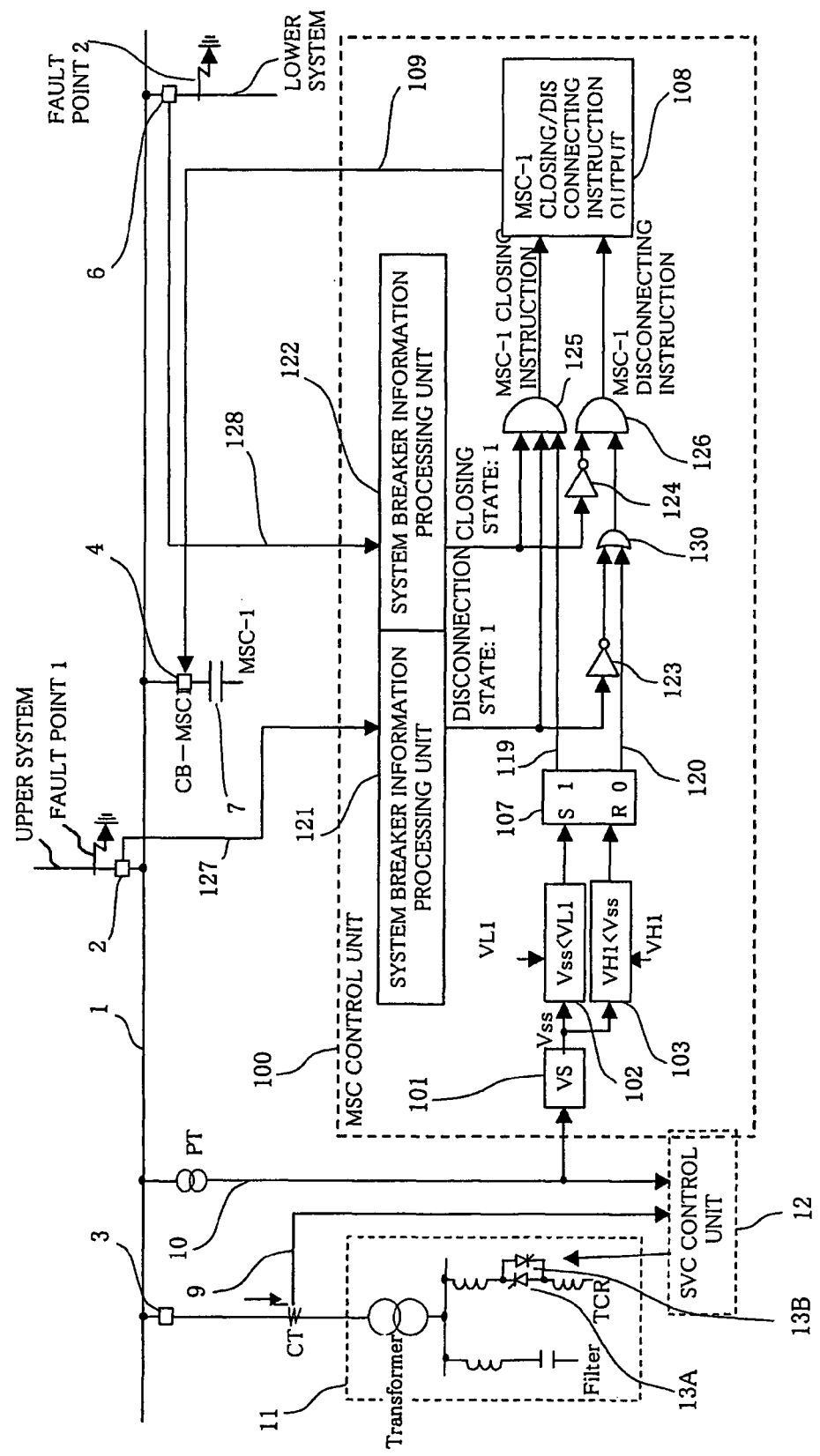
FIG. 6 is a view showing embodiment 6 of the invention, a structural view showing an example of a system stabilizing system, a general control block view of an MSC closing/disconnecting control method based on system breaker information at the time of occurrence of an electric power system fault and a structural view of an electric power system.

FIG. 6 relates to embodiment 6 of the invention and is a structural view of an MSC control method at the time of occurrence of a fault in an upper system connected to a bus through a breaker and to a power system (not shown) or in a lower system connected with a load (not shown). Incidentally, in FIG. 6, the same portions as those of FIG. 1 are denoted by the same symbols and their description will be omitted.

In FIG. 6, a voltage drop detection signal 119 is a signal of a level "1" from a flip-flop 107 when the voltage of a bus 1 is VL1 or lower, a voltage rise detection signal 120 is a signal of a level "0" from the flip-flop 107 when the voltage of the bus 1 is VH1 or higher, a system breaker information 127 is information of a closing state or a disconnection state of a breaker 2, and a system breaker information 128 is information of a closing state or a disconnection state of a breaker 6. A system breaker information processing unit 121 outputs a level "1" when receiving information indicating that the breaker 2 is in the disconnection state from the breaker information 127, a system breaker information processing unit 122 outputs a level "1" when receiving information indicating that the breaker 6 is in the closing state from the breaker information 128, a NOT circuit 123 outputs a level "1" when the output signal of the system breaker information processing unit 121 is received and the breaker 2 is in the closing state, a NOT circuit 124 outputs a level "1" when the output signal of the system breaker information processing unit 122 is received and the breaker 6 is in the disconnection state, and an OR circuit 130 outputs a level "1" when the output signal of one of the NOT circuit 123 and the voltage rise detection signal 120 is the level "1". The AND circuit 125 sends the closing instruction of an MSC 7 to a closing/disconnecting instruction output unit 108 when the voltage drop detection signal 119 and the output signals of the system breaker information processing unit 121 and the system breaker information processing unit 122 are the level "1". An AND circuit 126 sends a disconnecting instruction of the MSC 7 to the closing/disconnecting instruction output unit 108 when the output signals of the OR circuit 130 and the NOT circuit 124 are the level "1". A breaker 4 receives a closing/disconnecting instruction signal 109 from the closing/disconnecting instruction output unit 108, and closes or disconnects the MSC 7 to or from the bus 1.

In the structure as stated above, in the case where a fault occurs at a fault point 1 of the upper system, the voltage drop detection signal 119 becomes the level "1", and at the time point when the breaker 2 is disconnected and the fault point 1 is separated from the bus 1, the closing instruction of the MSC 7 from the AND circuit 125 is sent from the closing/disconnecting instruction output unit 108 to the breaker 4, and the MSC 7 is closed to the bus 1, the fault at the fault point 1 is separated from the bus 1, and the voltage drop of the bus 1 in the state where the lower system as the load system is connected to the bus 1 is prevented. On the other hand, in the case where a fault occurs at a fault point 2 of the lower system, the breaker 6 is disconnected, and at the time point when the fault point 2 is separated from the bus 1, the output signal of the NOT circuit 124 becomes the level "1", and since the breaker 2 is in the closed state, the output signal of the NOT circuit 123 is the level "1", the disconnecting instruction of the MSC 7 from the AND circuit 126 is sent from the closing/disconnecting instruction output unit 108 to the breaker 4, the MSC 7 is disconnected from the bus 1, and the voltage rise caused by the separation of the lower system as the load system from the bus 1 is prevented.

As stated above, according to the embodiment 6 of the invention, the closing/disconnecting control of the MSC is performed from the breaker information of the bus close end fault system, so that drop of the bus voltage after bus close end fault release can be prevented, and there is an effect that the SVC capacity in the voltage control to the bus close end fault can be decreased While the presently preferred embodiments of the present invention have been shown and described. It is to be understood that these disclosure are for the purpose of illustration and that various changes and modifications may be made without departing from the scope of the invention as set forth in the appended claims.

What is claimed is:

1. A system stabilizing control system of controlling reactive power by a reactive power compensating device being connected to a bus according to a voltage variation of an electric power system in which a capacitor is connected to the bus through a breaker, comprising
    a reactive power compensation control unit controlling the reactive power compensating device so as to suppress a voltage variation of the bus, and
    a switched capacitor control unit controlling the connection of the capacitor through the breaker so as to suppress a voltage variation of the bus,
    wherein the switched capacitor control unit controls the connection of the capacitor without being controlled by the reactive power compensation control unit,
    the switched capacitor control unit has a low voltage side threshold VL and a high voltage side threshold VH,
    the low voltage side threshold VL is set to a value higher than a voltage of a leading side inflection point of a voltage-reactive power characteristic of the reactive power compensating device,
    the high voltage side threshold VH is set to a value lower than a voltage of a lagging side inflection point of a voltage-reactive power characteristic of the reactive power compensating device and higher than the low voltage side threshold VL,
    when a voltage of the bus drops to the low voltage side threshold VL or lower, the capacitor is closed through the breaker to suppress a leading compensation reactive power amount caused by the reactive power compensating device, and
    when the voltage of the bus rises to the high voltage side threshold VH or higher, the capacitor is disconnected through the breaker to suppress a lagging compensation reactive power amount caused by the reactive power compensating device.

2. The system stabilizing control system according to claim 1, wherein the voltage-reactive power characteristic of the reactive power compensating device and the low voltage side threshold VL for closing of the capacitor at a time of drop in the voltage of the bus are made to cooperate with each other, and when the voltage of the bus drops to the low voltage side threshold VL or lower and the capacitor is closed through the breaker, the voltage of the bus becomes higher than the low voltage side threshold VL by the closing of the capacitor.

3. The system stabilizing control system according to claim 1, wherein the voltage-reactive power characteristic of the reactive power compensating device and the high voltage side threshold VH for disconnection of the capacitor at a time of rise in the voltage of the bus are made to cooperate with each other, and when the voltage of the bus rises to the high voltage side threshold VH or higher and the capacitor is disconnected through the breaker, the voltage of the bus becomes lower than the high voltage side threshold VH by the disconnection of the capacitor.

4. The system stabilizing control system according to claim 1 wherein
    a plurality of capacitors are respectively connected through a corresponding breaker to the bus,
    the switched capacitor control unit includes a plurality of the low voltage side thresholds and a plurality of the high voltage side thresholds,
    when the voltage of the bus drops, at least one of the plurality of capacitors is selectively closed through the breakers according to a drop state of the voltage of the bus, and a leading compensation reactive power amount caused by the reactive power compensating device is suppressed, and
    when the voltage of the bus rises, the plural at least one of the plurality of capacitors is selectively disconnected through the breakers according to a rise state of the bus voltage, and a lagging compensation reactive power amount caused by the reactive power compensating device is suppressed.

5. The system stabilizing control system according to claim 4, wherein the voltage-reactive power characteristic of the reactive power compensating device and the plurality of the low voltage side thresholds VL for closing of the corresponding capacitor at a time of drop of the voltage of the bus are made to cooperate with each other, and when the voltage of the bus drops to the low voltage side thresholds VL or lower and at least one of the capacitors is closed through the corresponding breaker, the voltage of the bus becomes higher than at least one of the low voltage side thresholds VL by the closing of at least one of the capacitors.

6. The system stabilizing control system according to claim 4, wherein the voltage-reactive power characteristic of the reactive power compensating device and the plurality of the high voltage side thresholds VH for disconnection of the corresponding capacitor at a time of rise of the voltage of the bus are made to cooperate with each other, and when the voltage of the bus rises to the high voltage side thresholds VH or higher and at least one of the capacitors is disconnected through the corresponding breaker, the voltage becomes lower than at least one of the voltage thresholds VH by the disconnection of at least one of the capacitors.

7. The system stabilizing control system according to claim 4, wherein selective closing/disconnection of the plurality of capacitors is judged based on a data storage table at the time of drop of voltage and a data storage table at the time of rise of voltage as a plurality of judgment criterion of the closing/disconnection corresponding to a magnitude of a detection value of the voltage of the bus,
    the plurality of judgment criterion is set to each of the data storage tables at the time of drop of voltage and a data storage table at the time of rise of voltage, and
    each capacitor of the plurality of capacitors is selectively and independently connected/disconnected to each other based on the plurality of judgment criterion of each of the data storage tables at the time of drop of voltage and a data storage table at the time of rise of voltage according to the magnitude of the detection value of the voltage of the bus.

8. The system stabilizing control system according to claim 1, wherein
the capacitor is closed/disconnected based on disconnection information of a bus breaker to be disconnected at a time of occurrence of a fault, and a compensation reactive power amount caused by the reactive power compensating device is suppressed.

* * * * *